Sept. 9, 1969 R. B. FREEMAN 3,465,932

BOLT CUTTING DEVICE

Filed Dec. 15, 1966 2 Sheets-Sheet 1

INVENTOR.
RICHARD B. FREEMAN
BY Toler & Ornstein
ATTORNEYS.

Sept. 9, 1969    R. B. FREEMAN    3,465,932
BOLT CUTTING DEVICE
Filed Dec. 15, 1966    2 Sheets-Sheet 2
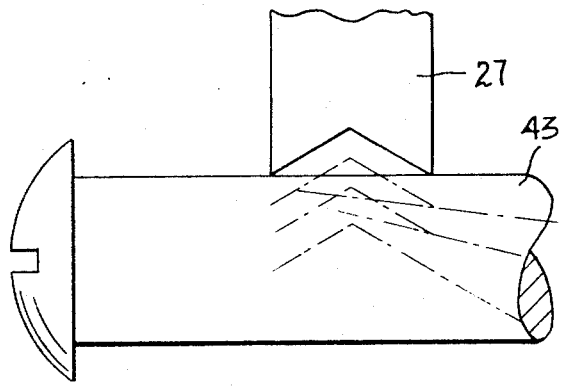
FIG. 6
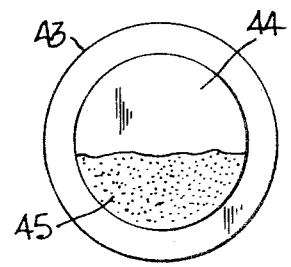
FIG. 7
FIG. 8
FIG. 9
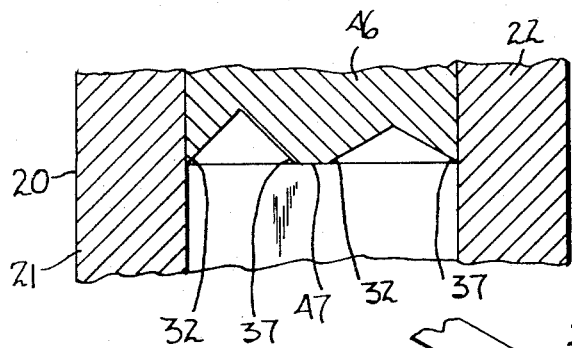
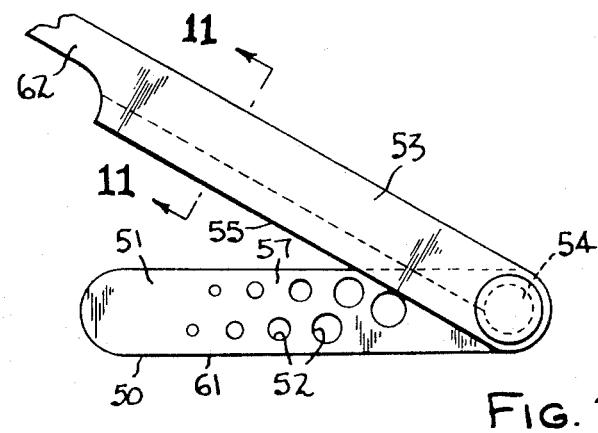
FIG. 10
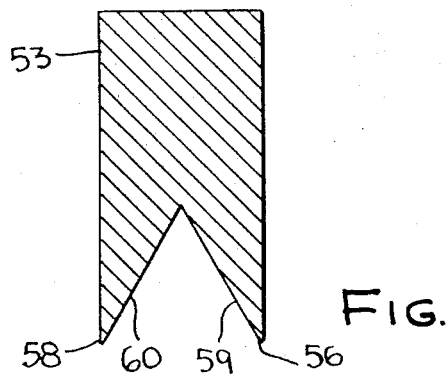
FIG. 11
INVENTOR.
RICHARD B. FREEMAN
BY
ATTORNEYS.

United States Patent Office 3,465,932
Patented Sept. 9, 1969

3,465,932
BOLT CUTTING DEVICE
Richard B. Freeman, 3354 Dorchester Road,
Shaker Heights, Ohio 44120
Filed Dec. 15, 1966, Ser. No. 602,059
Int. Cl. B65h 35/10; B26f 3/02; B26d 3/00
U.S. Cl. 225—2                                    17 Claims

ABSTRACT OF THE DISCLOSURE

An impact bolt cutting device having a cutting edge for diametrically shearing a bolt portion and having a tensioning abutment spaced from the shearing edge for applying a diametrical force to the bolt outwardly of the cutting area and in the same direction for separating the sliced surfaces and placing the cutting area under tension during the cutting action.

The present invention relates generally to devices or apparatus for cutting metal elements and, more particularly, to devices designed to shorten or reduce the length of threaded elements such as bolts, screws and the like.

Although threaded fastener elements such as bolts, machine screws, etc., are made in a variety of diameters and lengths suitable for most every purpose, it frequently happens that a workman or mechanic, particularly in the repair trade, will find that he does not have immediately available a threaded fastener of the length needed for his purposes. Under these circumstances, the usual expedient is to select a threaded fastener of longer-than-necessary length from the stock available and shorten it by sawing, chiseling, grinding or the like to the requisite length. The prior art has also provided bolt cutters which are intended to perform the shortening job more expeditiously, but these have a tendency to deform the body of the bolt, as well as to damage the threads. Furthermore, most of the prior art bolt cutting devices utilize some form of knife edge or chisel edge to effect a slicing action on the body of the bolt and use a pivotal arrangement to obtain a mechanical advantage by means of which manual pressure forces are compounded to obtain the requisite shearing force on the cutting edge or surface.

Even with the mechanical advantage obtained through such prior art devices, the manual forces required are of considerable magnitude and, particularly for the larger bolt sizes, the tools or devices become large, complex and unwieldy.

It is the primary object of my invention to provide a bolt cutting device in which the slicing or shearing action of the cutting edge of the tool is improved.

Another object of my invention is to provide a bolt cutting device in which the slicing or shearing action of the cutting edge of the tool is aided and augmented by the simultaneous application of a body tensioning force to the bolt in the area where the shearing action is occurring. This eliminates the need for pre-stressing of the bolt in the area of shear.

Still another object of my invention is to provide a bolt cutting device which is particularly adapted to be operated by an impact force, rather than a slow manual pressure build-up or squeeze of the type commonly associated with the pivotal devices of the prior art.

Other objects and advantages of my invention will become apparent during the course of the following description.

In the drawings, in which like reference numerals designate like parts throughout the same:

FIG. 6 is a schematic representation illustrating the progressive action of the bolt cutting device.

FIG. 7 is a view in front elevation of the cut end of a bolt, showing a typical appearance of the cut surface.

FIG. 8 is an enlarged fragmentary view, similar to FIG. 2, showing a modified form of bolt cutting tool.

FIG. 9 is an enlarged fragmentary view, similar to FIG. 8, showing still another modification of the form of bolt cutting tool.

FIG. 10 is a view in front elevation of a pivoted form of bolt cutting device utilizing the features of my invention.

FIG. 11 is an enlarged cross-sectional view, taken as indicated on line 11—11 of FIG. 10.

Figure 1:
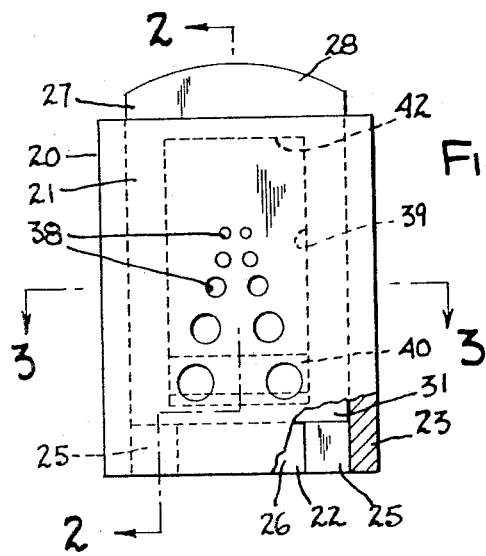
FIG. 1 is a view in front elevation of a bolt cutting device embodying the features of my invention.
Figure 2:
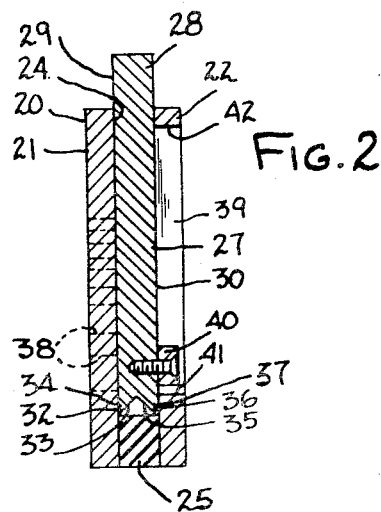
FIG. 2 is a longitudinal cross-sectional view of the device, taken as indicated on line 2—2 of FIG. 1.
Figure 3:
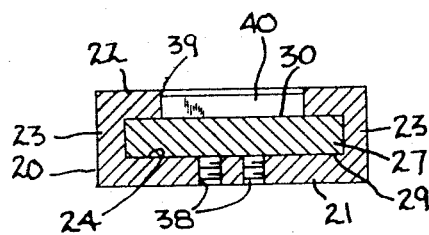
FIG. 3 is a transverse cross-sectional view of the device, taken as indicated on line 3—3 of FIG. 1.

Referring more particularly to the drawings, FIGS. 1–3 are various views of one physical embodiment of the invention. The device includes a sturdy, rigid body 20 which is made of any suitable material, such as steel, which will withstand the forces and impact involved. The body 20 serves as a support member for the element to be cut as well as serving as a housing and guide for the cutting tool.

The body has four sides designated as a front 21, a rear 22 and side walls 23. These walls enclose and define a central opening 24 of rectangular cross-section which extends vertically from top to bottom of the body 20. Although a bottom wall could be provided on the body 20 if desired, I consider it preferable that the bottom of the body be open, as this permits the scrap ends of the cut elements to exit from the device simply by lifting it from the surface on which it is being used. If the bottom of the body 20 were to be fully closed, then there would be a tendency for the scrap ends to accumulate on the bottom and eventually interfere with the operation of the device or cause unnecessary injury to the cutting tool. Therefore, adjacent the bottom of the body 20, I provide a pair of inwardly directed parallel abutments 25, which are spaced from each other to retain an exit opening 26 in the bottom of the body. The spaced abutment members 25 may be of metal and may be provided by flanging the side walls 23. However, both from the standpoint of increasing the life of the cutting tool and of reducing the shock of impact, I prefer to utilize a resilient or shock absorbent material, such as rubber or polyurethane, for the abutment members 25 and these can be secured adhesively or otherwise to the side walls 23 adjacent the bottom edge thereof.

A tempered tool steel cutting tool 27 is provided and has a rectangular cross-section conforming to and substantially coextensive with the cross-sectional configuration of the central opening 24 in the body. The tool is received snugly and slidably within the opening 24 and has a length which will permit its upper end 28 to project above the body when the cutting tool is at the bottom of its stroke.

In manufacturing the device, it is necessary that the inner surfaces of the opposed front and rear walls 21 and 22 of the body be smooth and parallel. Likewise, it is necessary that the corresponding front face 29 and rear face 30 of the cutting tool also be smooth and parallel with each other. The dimension between the faces 29 and 30 of the tool should be only slightly less than the dimension between the opposed inner surfaces of the parallel walls 21 and 22, and preferably within .003 of such dimension so that the tool is guided linearly and has little or no opportunity to stray as a result of excessive clearance between the tool and the front and rear walls of the body.

The lower end 31 of the cutting tool is provided, adjacent the bottom of the front face 29, with a transversely extending cutting edge 32 which is parallel to the plane of the front face 29 and preferably lies in the plane thereof. The cutting edge 32 is formed by beveling the end of the cutting tool upwardly and inwardly from the bottom edge of the front face 29 to provide an internal surface 33 on the tool which extends at an angle 34 to the plane of the front face of the tool. The surface 33 is intersected by another internal surface 35 which extends upwardly and inwardly from the bottom of the rear face 30 of the tool at an angle 36 to the plane of the rear face. The bottom of the surface 39 defines a tensioning abutment 37 on the bottom of the tool in substantially the same horizontal plane as the front cutting edge 32. The angles 34 and 36 are not necessarily equal to each other, but for ease of manufacture they will customarily be made equal and will be so considered in the description that follows. From the standpoint of preventing breakage of the cutting edge, it is apparent that the angle 34 should be as large as possible. On the other hand, such an edge would tend to dull quickly and, from the standpoint of maintaining a sharp edge for slicing action, it is desirable that the angle 34 be made as small as possible. These conflicting factors affecting the size of the angle 34 are compromised in the range of 30° to 60° with a nominal 45° angle appearing to be most effective from the standpoint of reconciling the two factors.

The front wall 21 of the body 20 is drilled and tapped to provide a plurality of spaced threaded openings 38 whose axis lies normal to the direction of movement of the cutting tool 27. Each of the openings 38 is of a particular diameter and thread size so that each opening is adapted to threadedly receive a particular size of bolt or screw. By way of example, there may be a total of ten such openings 38 adapted to receive bolt or screw sizes such as 4–40, 4–48, 6–32, 6–40, 8–32, 8–36, 10–24, 10–32, ¼–20 and ¼–28, thus covering a fairly broad range of the commonly used small bolt sizes. It will be understood that the specifications of the openings 38 are a matter of selection and choice which, depending upon the circumstances, may result in a greater or lesser number of openings 38 than here illustrated, and whatever the number of openings, they may be of different size specifications than herein indicated.

The rear wall 22 of the body 20 is provided with an elongated slot or opening 39, of sufficient width to permit traversal thereof by the ends of any bolts or screws which are inserted in any one of the openings 38. A guide stub or projection 40 is mounted on the rear face 30 of the tool in slidable engagement with the opening 39. This arrangement provides an additional guide track for the cutting tool in its vertical movement, as well as acting to limit the vertical movement of the cutting tool in both the upper and lower directions. The lower edge 41 of the slotted opening 39 can be positioned to arrest downward movement of the tool after the initial impact shock has been absorbed by the resilients pads or abutments 25. The upper edge 42 of the slot 39 limits upward movement of the cutting tool so as to prevent it from inadvertently slipping out of or falling out of the body 20, but is so positioned as not to intefere with the movement of the tool to its upper operative position.

In the operation of this bolt cutting device, the cutting tool 27 is manually elevated to permit the overly long bolt or screw to be threaded into the proper opening 38 to the desired depth. That portion of the bolt or screw which extends into the opening 24 in the body 20 is the portion which will be separated from the remainder of the bolt or screw.

After the element to be cut has been properly positioned, the cutting tool 27 can be manually retained in its elevated position or it may be permitted to drop to a position of rest in engagement with the element to be cut. In either case, the upper end 28 of the cutting tool is now subjected to an impact force, such as by hitting it with a hammer, to drive the cutting tool downwardly in the opening 24, during which movement the inwardly projecting portion of the bolt or screw is separated from the remainder of the element being cut and drops into the exit opening or space 26 as the bottom of the cutting tool comes to rest on the resilient abutments 25. The shearing action of the cutting tool 27 is accomplished by one sharp impact or blow on its upper end, which is sufficient to complete the shearing action. The shearing action is sudden and quick and is accomplished without any great manual effort and without any significant deformation of the bolt body or of its screw threads on that portion of the bolt which is to be retained and used. The shearing action is so rapid and instantaneous that, in contrast to the prior art type of squeeze or hand pressure operation, the bolt has no opportunity to rotate or shift position during the shearing action. Thus, a clean and accurate cut is obtained.

The headed portion of the bolt can then be unthreaded to remove it from the opening 38 in which it was inserted, and as it is removed, the threads on the bolt will be rechased by the threaded opening 38 to remove any slight burrs that may have resulted from the cutting operation. However, it has been observed that the edge 32 of the cutting tool acts much like a milling cutter as it passes across the end face of the bolt being cut, cutting or shaving away any surface projections or irregularities, so that it is ordinarily unnecessary to require or rely upon the unthreading of the bolt to rechase the threads. The milling effect of the cutting edge 32 accomplishes this result more quickly and without extra effort, so that the bolt can be easily removed after it has been cut. This milling action of the cutting edge 32 can be augmented, if desired, by providing an abrading portion on the cutting tool in the plane of the front face 29, which will traverse the end of the bolt as the cutting tool moves downwardly. The device is then ready to be used again.

As illustrated in the drawings, the device is relatively small and compact and can easily be carried from one place to another, as required. By way of example and illustration, the device described and shown in FIGS. 1–3 of the drawings can have an overall height of less than three inches, an overall width of less than two inches and an overall thickness of less than three quarters of an inch. It can accurately be referred to as "pocket size," as it is slightly smaller than a conventional cigarette package.

The compact size of the device is attributable in great part to the fact that the action of the cutting tool 27 is more rapid and more efficient than is the case with conventional cutting tools provided for such purposes. This improvement in the cutting tool permits the cutting action to be accomplished with an impact force of relatively low magnitude which need be applied just once and which requires only a short movement or stroke of the cutting tool. This improvement in the cutting tool is more fully described hereinafter by reference to FIGS. 4–7 of the accompanying drawings.

Figure 4:
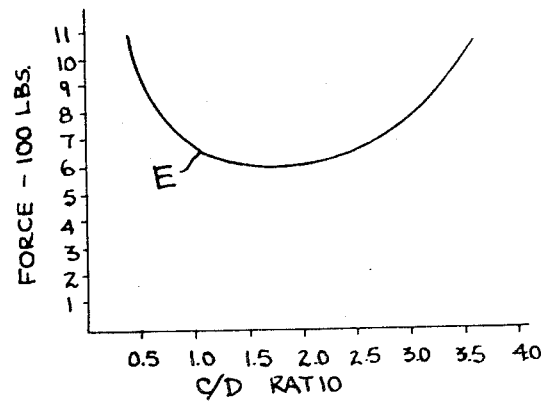
FIG. 4 is a graph showing the effect of certain dimensional relationships on the force required to cut a bolt.
Figure 2A:
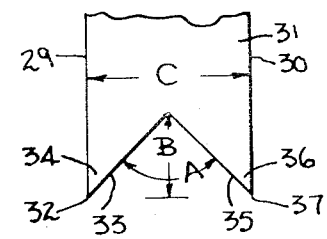
FIG. 2a is an enlarged fragmentary view of the lower end of the cutting tool shown in FIG. 2.

From the foregoing description of the cutting tool 27 it will be apparent that the cutting tool engages the bolt at two spaced points defined by the front cutting edge 32 and the tensioning abutment 37. The function of the cutting edge 32 is to cut or slice through the bolt. The function of the tensioning abutment 37 is to stress or pretension the bolt during the slicing or cutting action of the cutting edge 32, so as to urge the separation of the bolt portions at the cut surfaces and "open" the cut as it progresses thereby reducing the cutting force required as well as improving the character of the cut. It has been found that if the spacing between the portions 32 and 37 are correctly established in relation to the diameter of the bolt being cut, that the desired effect can be obtained at minimum or reduced impact force values. In FIG. 4 of the drawings, I have graphically illustrated the effect of this relationship on the force required to slice a bolt. For the purpose of explaining the curve of FIG. 4, as well as the curve of FIG. 5, I have designated certain dimensional characteristics or relationships of the cutting tool 27 in the manner indicated in FIG. 2a of the drawings, as follows: A designates the included angle between the intersecting surfaces 33 and 35 of the cutting tool 27; B designates the vertical dimension from the apex of the angle A to the plane of the tensioning abutment 37; C designates the dimension of the horizontal distance between the edges 32 and 37 of the cutting tool. For purposes of brevity, I will use the letter D to designate the diameter of the bolt being cut.

In FIG. 4, the abscissa of the graph represents the ratio of the dimension C to the bolt diameter D. The ordinate of FIG. 4 is plotted in terms of pounds of force required to slice the bolt having the diameter D. For purposes of obtaining the data plotted on FIG. 4, tests were conducted using a cutting tool having a C dimension of ¼ inch and having an included angle A of 90°. The tests were repeated with a cutting tool having a C dimension of ⅛ inch, as well as with a cutting tool having a C dimension of ⅜ inch. It will be noted that the curve E, which represents the results of these tests, indicates that a minimum value of force was required to slice the bolt when the C/D ratio was 2. On either side of this ratio point, the curve E has a gradual upward slope which increases at an accelerated rate at approximately the ratio point 1 on the lower side and the ratio point 3 on the high side of the abscissa. Between the ratio points 1 and 3 for C/D, the slicing force varies within a relatively narrow range of values. This can be considered the operating or working range of the cutting tool. To either side of these ratio points, the slicing force range broadens considerably. When the C/D ratio is above approximately 3, it is believed that the relatively large spacing C creates such great leverage of the abutment 37 on the bolt that the bolt is distorted beyond its yield point thus minimizing the desired pretensioning effect as the bolt is being sliced by the cutting edge 32. This distortion can also result in premature rupture of the bolt before the cutting edge 32 has an opportunity to complete its slicing action. Either or both of these factors would result in a substantial increase in the force required to separate the bolt. On the other hand, when the C/D ratio is in the decreasing range below the value of 1, the leverage effect of the edge 37 is substantially diminished and there is very little tensioning of the bolt at the slicing surface. In these circumstances, the edge 37 tends to act more like a cutting edge than a tensioning abutment and its effect is to multiply the force required to sever the bolt as indicated on the curve E. Thus, in designing the bolt cutting device herein described, it is desirable to limit the use of the device to a range of bolt diameters in which the C/D ratio is in the range from approximately 1 to approximately 3.

Figure 5:
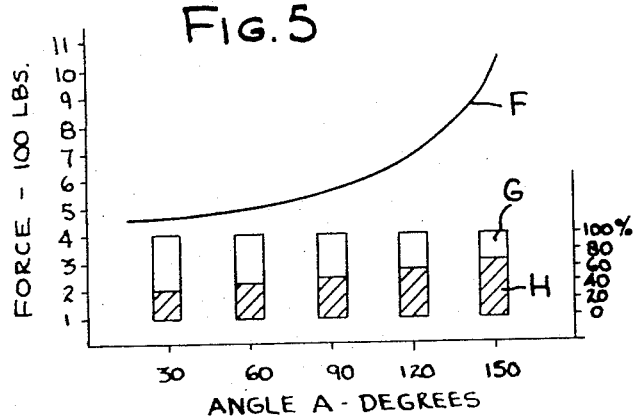
FIG. 5 is a graph showing the effect of the angularity of the cutting tool on the requisite bolt cutting force, as well as showing the effect of angularity on the character of the area of separation of the bolt.

In FIG. 5 of the drawings, a curve F has been plotted showing the relationship between the cutting angle of the cutting edge 32 of the tool and the force required to slice a bolt. For convenience and ease of manufacture, the angular surfaces 33 and 35 of the cutting tool will ordinarily be formed in such manner that the plane or line of intersection of these surfaces is at the mid-point of the cutting tool. The angles 34 and 36 would then be equal and would have values equivalent to ½ of the value of the included angle A. In FIG. 5, the abscissa represents values of angle A which can be translated into values of the cutting angle 34 on the basis above described and which are shown below the value figures for the angle A. It will be understood, however, that the cut-out or interior surface of the cutting tool, as defined by the surfaces 33 and 35, need not be isosceles in character, as described, and need not necessarily consist of plane intersecting surfaces, as described, but could be arcuate if desired.

It will be noted that the force required to slice the bolt, as indicated in FIG. 5, increases as the angularity of the cutting edge increases. The slope of the curve F increases more rapidly after the angle A exceeds 120°, equivalent to a value of 60° for the cutting angle 34. On the other hand, as a practical matter, when the angle A is less than 60°, equivalent to a cutting angle of 30°, it has been found that the cutting edge 32 of the tool tends to dull very quickly and loses its effectiveness as a cutting edge after a relatively short period of operation. Inasmuch as the slicing force required when the angle A is less than 60° is not markedly lower than the force required when the angle A is at 60°, it is considered preferable that the slight force advantage obtained through use of the sharper cutting angles be sacrificed or compromised in favor of a less acute cutting angle 34 of at least 30° which is less susceptible to dulling and has a significantly greater longevity than a cutting edge formed with a more acute angle.

In inspecting the ends of bolts cut with my device, it is evident that the separation of the bolt occurs in two phases. During the first phase of separation, a slicing action occurs which is followed by the second phase consisting of a rupture or fracture of the weakened section of the bolt. This characteristic appearance of the separated end surface of a bolt cut with my device is illustrated in FIG. 7 of the drawings. I have there shown a cut end of a bolt 43 with the sliced surface indicated by the reference numeral 44 and the ruptured or fractured surface indicated by the numeral 45. When the area of the respective surfaces 44 and 45 is calculated, it has been found that the ratio of the sliced area to the ruptured area increases as the cutting angle 34 of the edge 32 decreases and, conversely that the ruptured area becomes more predominant as the cutting angle 34 increases. This relationship at various cutting angles has been shown by a series of bar graphs in FIG. 5. The upper portion G of each bar represents the relative sliced area of the end of the bolt and the lower portion H of each bar represents the remaining relative ruptured area. In the tests which were conducted, a C/D ratio of 2 was maintained for each of the cutting tools used and it will be noted that as angle 34 increased in value, the area of the sliced surface 44, as represented on the bar graphs by the letter G, tended to decrease in relation to the ruptured area 45, as represented on the bar chart by the letter H. Based upon the foregoing test results, as illustrated in FIG. 5, and considering the practical aspect of longevity of the cutting edge, as previously discussed, it is considered preferable that the angle 34 of the cutting edge 32 be in the range of 30° to 60°, which in the form of cutting tool shown is equivalent to an angle A ranging from 60° to 120°.

The previously described two-phase separation of the bolt is indicated schematically in FIG. 6 of the drawings, in which the progressive slicing and tensioning effects are illustrated. The successively lower positions of the cutting tool 27 are shown in phantom outline and the corresponding positions of the unsupported portion of the bolt 43 are likewise shown in phantom outline. It will be observed that the abutment 37 continues progressive tensioning displacement of the body of the bolt 43 as the slicing action effected by the cutting edge 32 progresses as the tool moves downwardly. When the cutting tool and the bolt reach the positions shown in the lowermost phantom outline, the internal space defined by the walls 33 and 35 of the cutting tool has been loaded or filled by the severed portion of the bolt 43 and further downward movement of the cutting tool results in rupture of the weakened bolt section in contrast to the slicing type of severance which occurred previously. However, inasmuch as the area of the ruptured section is considerably less than the total cross-sectional area of the bolt, the severance force required is less than that which was required to initiate the slicing action on the bolt.

However, if the internal clearance space of the cutting tool 27 is inadequate, then the point at which the profile of the severed portion of the bolt interferes with further slicing action of the cutting tool occurs much sooner than above described and, correspondingly, the relative area of the ruptured surface or the surface to be ruptured increases in magnitude. Considering the configuration of cutting tool as herein described and giving consideration to the parameters of the operating ranges of the angle A and the C/D relationship, it has been determined that this internal or clearance area of the cutting tool should be of sufficient magnitude to accommodate the profile of the severed portion of the bolt until at least 60% of the cross-sectional area of the bolt has been subjected to the slicing action of the cutting edge 32. For purposes of designing the cutting tool, this limitation can be translated into a range for the dimension B of the tool from .283 D to 2.6 D, where D represents the diameter of the bolt being cut. The lower limit of the dimension B can be used for example when $C/D$ is 1 and angle A is 120°. The upper dimensional limit of B might be used when $C/D$ is 3 and angle A is 60°. Thus, by providing a predetermined distance between the cutting edge of the tool and the tensioning abutment of the tool, providing adequate internal clearance space on the cutting tool to accommodate the severed profile of the bolt until at least 60% of the cross-section of the bolt has been sliced, and providing a suitable cutting angle on the cutting edge of the tool, an effective tensioning and slicing characteristic is obtained for the cutting tool which minimizes the severance forces required on the bolt.

In FIG. 8 of the drawings, I have illustrated my device utilizing a modified form of cutting tool 46 whose operation is identical with that of the previously described cutting tool 27, except that it can be termed "reversible" in that a second set of edges 32 and 37 is provided thereon, spaced from the first pair of edges 32 and 37 by an intermediate portion 47 on the bottom of the tool. Each pair of edges 32 and 37 represents an operable or functional portion of the tool which is utilized independently of the other portion for bolt cutting purposes. Both of these operable portions can be of identical physical dimension and configuration, if desired. In such case, one portion of the tool would be used until it became unserviceable by reason of dullness or breakage, and then the tool could be removed from the body 20 and replaced therein in a position where the other portion of the tool could be utilized for continued bolt cutting operation. However, it is preferable that the two portions not be alike, but that one of the portions be dimensioned, giving consideration to the factors heretofore discussed, so that it is designed to effectively cut bolts of larger diameter than could be cut effectively by the other operating portion of the cutting tool. This provides a greater bolt size cutting range and versatility for the device.

Referring now to FIG. 9 of the drawings, I have shown another modified form of bolt cutting tool, which is less efficient than the previously described forms, in that the tensioning abutment is eliminated and a direct slicing or shear action is relied upon. In this form, the body 20 is again provided for the purpose of guiding the cutting tool and supporting the bolt element to be cut. However, a cutting tool 48 is provided with a cutting edge 49 at the lower end thereof, in the form of a chisel edge or the like. The cutting tool 48 is operated by impact in the manner previously described, but it has been found that the forces required to shear the bolt are of greater magnitude than those necessary in the previously described form of the invention. However, the arrangement of the cutting tool in the body 20 and the close tolerances employed in guiding the cutting tool in its shearing action, does result in a cutting action which minimizes deformation of the cut end of the bolt and, to that extent, is superior in performance to the prior art devices.

In FIGS. 10 and 11 of the drawings, I have shown another modified form of my bolt cutting tool which utilizes a pivoted structural arrangement.

In this instance, a device 50 is provided which includes a support arm 51 provided with a plurality of drilled and tapped openings 52 to accommodate various diameters and thread specifications of bolts or cap screws. A cutting arm 53 is pivotally secured, as at 54, to one end of the support arm 51 in overlapping relationship thereto. The inward side or edge 55 of the cutting arm 53 is formed with a cutting edge 56 which is disposed to have wiping engagement with the adjacent plane surface 57 of the support arm 51, through which the bolt projects.

The edge 55 is also provided with a tensioning abutment 58 which is spaced from the cutting edge 56 in the same manner previously described with reference to the embodiment of FIGS. 1-3. The internal clearance on the cutting arm 53 is provided by the angularly disposed intersecting internal surfaces 59 and 60 which are the functional counterparts of the surfaces 33 and 35 previously described.

In this form of pivoted tool, the bolt cutting operation can be accomplished either by impact force or by a manual pressure force. If an impact force is used for operation of the tool, the tool is placed on a supporting surface with the external edge 61 of the support arm 51 in abutment with the support surface. The cutting arm is then pivoted to a position adjacent to the bolt which has been threaded into one of the openings 52 and is given a sharp blow to cause the bolt to be severed. For bolts of relatively small diameter, the same action can be accomplished manually by applying manual impact or manual pressure to the cutting arm 53. For this purpose, the cutting arm 53 may be made of longer length than the support arm 51 so that a handle portion 62 can conveniently be provided thereon.

It will be noted that this form of pivoted cutting tool employs the same principle of a cutting edge and a tensioning abutment space therefrom to accomplish tensioning of the bolt during the cutting action of the edge 56. Thus the required shearing force is minimized and an efficient severance of the bolt is accomplished.

Although the embodiments of the invention have been described in terms of a cutting device wherein threaded openings are provided in a member for receiving and supporting threaded elements to be severed, it will be understood that the utilization of the device is not so limited. The principles of the invention can be applied to the cutting of lengths of wire, rod, bar and other similar threaded or unthreaded metallic elements which can be supported in projecting relationship to the action of the cutting tool by means of openings which may optionally be provided with internal gripping surfaces, but need not necessarily be provided with a helical thread. Therefore, in the appended claims, I intend that the word "bolt" be a descriptive term embracing both threaded and unthreaded elements.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention, I claim:

1. In a bolt-severing device, the combination of a bolt-retaining member, a cutting tool movably associated with said member to traverse a bolt portion projecting into the path of movement of said tool, a cutting edge provided on said tool, and a tensioning abutment provided on said tool in substantially parallel spaced relationship to said cutting edge for engaging said bolt portion outwardly of its engagement by said cutting edge.

2. A combination as defined in claim 1, wherein said cutting edge and said tensioning abutment define therebetween a clearance recess extending interiorly of said cutting tool.

3. A combination as defined in claim 2, wherein said bolt-retaining member is a housing having a wall provided with at least one threaded opening therein, and said cutting tool is slidably mounted in said housing for relative movement thereto.

4. A combination as defined in claim 3, wherein said housing is provided with an open top and an open bottom, and resilient spaced abutments are mounted adjacent said bottom in the path of movement of said cutting tool.

5. A combination as defined in claim 3, including a slot provided in at least one wall of said housing and oriented in the direction of movement of said cutting tool, and a projection provided on said cutting tool and traversing said slot, whereby to limit the movement of said tool relative to said housing.

6. A combination as defined in claim 2, wherein said bolt-retaining member is pivotally connected to said cutting tool.

7. A combination as defined in claim 6, wherein said bolt-retaining member is provided with a plurality of threaded bolt-retaining openings whereby a bolt can be caused to project into the path of movement of said cutting tool, said cutting tool has wiping engagement with said member, and said cutting edge traverses all of said openings during bolt-severing movement of said cutting tool.

8. A combination as defined in claim 2, wherein said cutting edge of said tool is spaced from said tensioning abutment by a distance not less than the diameter of the bolt to be cut and not more than three times the diameter of said bolt.

9. A combination as defined in claim 2, including an angularly-disposed wall extending from said cutting edge interiorly of said tool and defining a portion of said clearance recess, a second angularly-disposed wall extending from said tensioning abutment interiorly of said tool into intersection with said first wall and defining the remaining portion of a clearance space of triangular cross-section and the altitude of said triangular clearance space being not less than 0.283 times the diameter of the bolt to be cut and not more than 2.6 times said diameter.

10. A combination as defined in claim 2, wherein said clearance space has a cross-sectional area sufficient to accommodate the severed profile of a bolt until at least 60% of the cross-sectional area of the bolt has been subjected to engagement with said cutting edge.

11. A combination as defined in claim 2, including a second cutting edge provided on said tool opposite said first-named cutting edge, a second tensioning abutment provided on said tool opposite said first-named tensioning abutment and inwardly of said second cutting edge.

12. A combination as defined in claim 11, wherein the space between said second cutting edge and said second tensioning abutment is greater than the space between said first-named cutting edge and said first-named tensioning abutment.

13. A combination as defined in claim 2, wherein said cutting edge is coplanar with said tensioning abutment.

14. In a bolt-severing device, the combination of a bolt-retaining member, a cutting tool movably associated with said member to unidirectionally traverse one side to the other of a bolt projecting from said member, bolt-slicing means provided on said tool, and bolt-tensioning means provided on said tool in spaced relationship to said slicing means and diametrically engageable with an unsliced surface of said bolt to apply a transversely directed stress to said bolt outwardly of the sliced portion thereof to increasingly separate the sliced surfaces thereof in response to bolt-slicing movement of said cutting tool.

15. A method of severing one portion of a bolt from the remainder of said bolt, comprising the steps of: disposing said one portion in space while retaining said remainder against displacement, cutting said one portion diametrically and unidirectionally from one side to the other adjacent to the area of retention, and simultaneously applying a diametrical force to said bolt in the same direction as said cut at an axially-spaced distance from said cutting area to create a severing tension on said bolt in said cutting area and increasingly separate the sliced surfaces thereof.

16. A method as defined in claim 15, including the subsequent step of maintaining a tensioning force on said bolt until the cut section has reduced the contiguous unsevered cross-sectional area of said bolt to a value at which said tensioning force is sufficient to cause rupture of the reduced unsevered area.

17. A method as defined in claim 16, wherein said unsevered cross-sectional area of said bolt has been reduced to at least 40% of the full cross-sectional area of the bolt.

References Cited

UNITED STATES PATENTS

| 1,187,384 | 6/1916  | Chauveau        | 225—96.5  |
| 1,309,354 | 7/1919  | Dallmeyer et al.| 225—96 X  |
| 1,366,063 | 1/1921  | Culhane         | 225—96 X  |
| 2,526,362 | 10/1950 | Johnston        | 225—96    |
| 3,268,137 | 8/1966  | Martin          | 225—96.5 X|

WILLIAM S. LAWSON, Primary Examiner

U.S. Cl. X.R.

83—13, 694; 225—96.5